United States Patent
Rossell et al.

(10) Patent No.: US 9,443,171 B2
(45) Date of Patent: Sep. 13, 2016

(54) METHODS FOR PRINTING WITH A PRINTHEAD

(75) Inventors: Marti Rius Rossell, Barcelona (ES); Peter Morovic, Barcelona (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/418,691

(22) PCT Filed: Jul. 31, 2012

(86) PCT No.: PCT/EP2012/064936
§ 371 (c)(1),
(2), (4) Date: Jan. 30, 2015

(87) PCT Pub. No.: WO2014/019608
PCT Pub. Date: Feb. 6, 2014

(65) Prior Publication Data
US 2015/0314598 A1    Nov. 5, 2015

(51) Int. Cl.
*G06K 15/10*    (2006.01)
*B41J 2/045*    (2006.01)

(52) U.S. Cl.
CPC .......... *G06K 15/102* (2013.01); *G06K 15/107* (2013.01); *B41J 2/04593* (2013.01); *B41J 2/04595* (2013.01)

(58) Field of Classification Search
CPC ................ B41J 2002/14459; B41J 2/04593; B41J 2/04543; B41J 2/355; B41J 2/3551; G06K 15/102; G06K 15/107
See application file for complete search history.

(56) References Cited

U.S. PATENT DOCUMENTS 4,167,728 A * 9/1979 Sternberg ................. G06K 9/36
382/303
6,157,461 A * 12/2000 Doron .................. G06K 15/107
347/12

(Continued)

FOREIGN PATENT DOCUMENTS

EP          0704307       4/1996
JP       2000-272171     10/2000

(Continued)

OTHER PUBLICATIONS

International Search Report and Written Opinion, Aug. 22, 2013, PCT Patent Application No. PCT/EP2012/073996, European Patent Office, HPDC.

(Continued)

*Primary Examiner* — Lisa M Solomon
(74) *Attorney, Agent, or Firm* — HP Inc. Patent Department

(57) ABSTRACT

A method for printing with a printhead, comprising: generating a first imaging matrix comprising cells each containing information related to the ink to be deposited on a corresponding area of the print medium; on the basis of said first matrix, generating a second imaging matrix, comprising cells each containing information related to the ink drops to be deposited on a corresponding area of the print medium; wherein some cells of the second matrix are prioritized and for some of them the information related to the ink drops depends on a cell of the first matrix that corresponds to a different area of the print medium than the area of said prioritized cell of the second matrix; such that upon printing, nozzles of the printhead associated with some prioritized cells fire ink that in the first matrix is associated with areas of the print medium corresponding to non-prioritized cells.

22 Claims, 7 Drawing Sheets

(56) References Cited

U.S. PATENT DOCUMENTS

| | | | |
|---|---|---|---|
| 6,166,822 A * | 12/2000 | Harrington, III | G06K 15/02 358/1.13 |
| 6,166,828 A | 12/2000 | Yamada et al. | |
| 6,547,354 B1 | 4/2003 | Askeland et al. | |
| 6,575,545 B2 | 6/2003 | Vega et al. | |
| 7,866,778 B2 | 1/2011 | Silverbrook et al. | |
| 2005/0078133 A1 | 4/2005 | Molinet et al. | |
| 2005/0190233 A1 | 9/2005 | Bhattacharjya et al. | |
| 2006/0119660 A1 * | 6/2006 | Ochiai | B41J 2/04541 347/40 |
| 2010/0091053 A1 | 4/2010 | Jackson et al. | |
| 2010/0165028 A1 | 7/2010 | Wright et al. | |
| 2011/0211205 A1 | 9/2011 | Itogawa | |
| 2015/0298474 A1 | 10/2015 | Rius Rossell | |

FOREIGN PATENT DOCUMENTS

| | | |
|---|---|---|
| JP | 2001-277495 | 10/2001 |
| JP | 2003-134340 | 5/2003 |
| JP | 2010-263618 | 11/2010 |

OTHER PUBLICATIONS

Lee et al.; The Application of Drop-on-demand Ink Jet Technology to Color Printing; IEEE, vol. 28; Issue 3; pp. 307-313.

International Search Report and Written Opinion dated May 17, 2013, issued on PCT Patent Application No. PCT/EP2012/064936 filed Jul. 31, 2012, European Patent Office.

The International Bureau of WIPO, International Preliminary Report on Patentability for PCT/EP2012/064936 dated Feb. 3, 2015 (5 pages).

* cited by examiner

METHODS FOR PRINTING WITH A PRINTHEAD

CLAIM FOR PRIORITY

The present application is a national stage filing under 35 U.S.C. 371 of PCT application number PCT/EP2010/064936, having an international filing date of Jul. 31, 2012, the disclosure of which is hereby incorporated by reference in its entirety.

BACKGROUND

A printing device is generally configured to produce print content (e.g., text, image, etc.) on a print medium in response to receiving a print job.

BRIEF DESCRIPTION OF THE DRAWINGS

Scanning inkjet printers employ one or more printheads mounted on a carriage which travels repeatedly across a scan axis as the print medium is advanced stepwise past the scan axis. The printheads may have a plurality of nozzles for firing ink drops on the medium, such that they lay down swaths of ink during each scan travel, between advances of the print medium.

However, as the printheads travel, they create a current of air across the uncapped (or decapped) nozzles of the printheads: the current of air may cause evaporation of a solvent vehicle component of the ink, and this in turn may bring about pigment enrichment, and increase viscosity in the nozzle orifice. As a consequence, nozzles that have not fired for a certain amount of time may fire smaller ink drops, or may not fire any ink, and/or may fire drops on the medium with a positioning error.

When this happens, it may take a certain number of firing events before the nozzle recovers its normal parameters of operation; in the meantime, because e.g. of the absence or smaller volume of the ink drops on an area of the medium, this area may be seen as a different colour; this visual artifact is known as decap.

DETAILED DESCRIPTION

Decap also occurs in Page-Wide Array (PWA) printers, which employ an array of printheads extending across the width of the page, which is maintained in a static position during printing while the medium advances under the printheads. A current of air is similarly created by the relative movement between the medium and the printheads.

In scanning printers, the printheads may be caused to fire a short burst of ink drops into an ink collector after every printh swath ("fly-by-spit"), and this may help to reduce the severity of decap: however, page-wide array printers have much more limited means of refreshing the status of nozzles in a periodic way, and therefore they are particularly sensitive to decap. In multipass page-wide array printers the intervals between nozzle refresh operations are multiplied by the number of passes, and the problem of decap may thus be even more critical.

SUMMARY

With methods for printing with a printhead according to examples described in the following the occurrence and/or effects of decap are reduced.

Figure 1A:
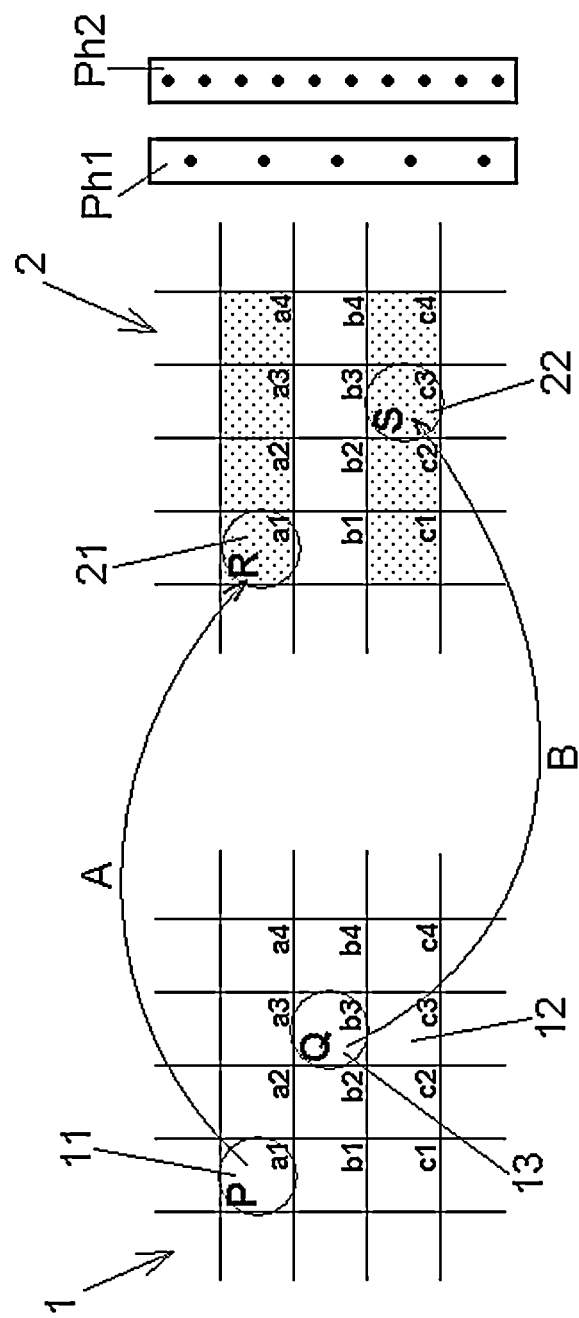
Figure 1B:
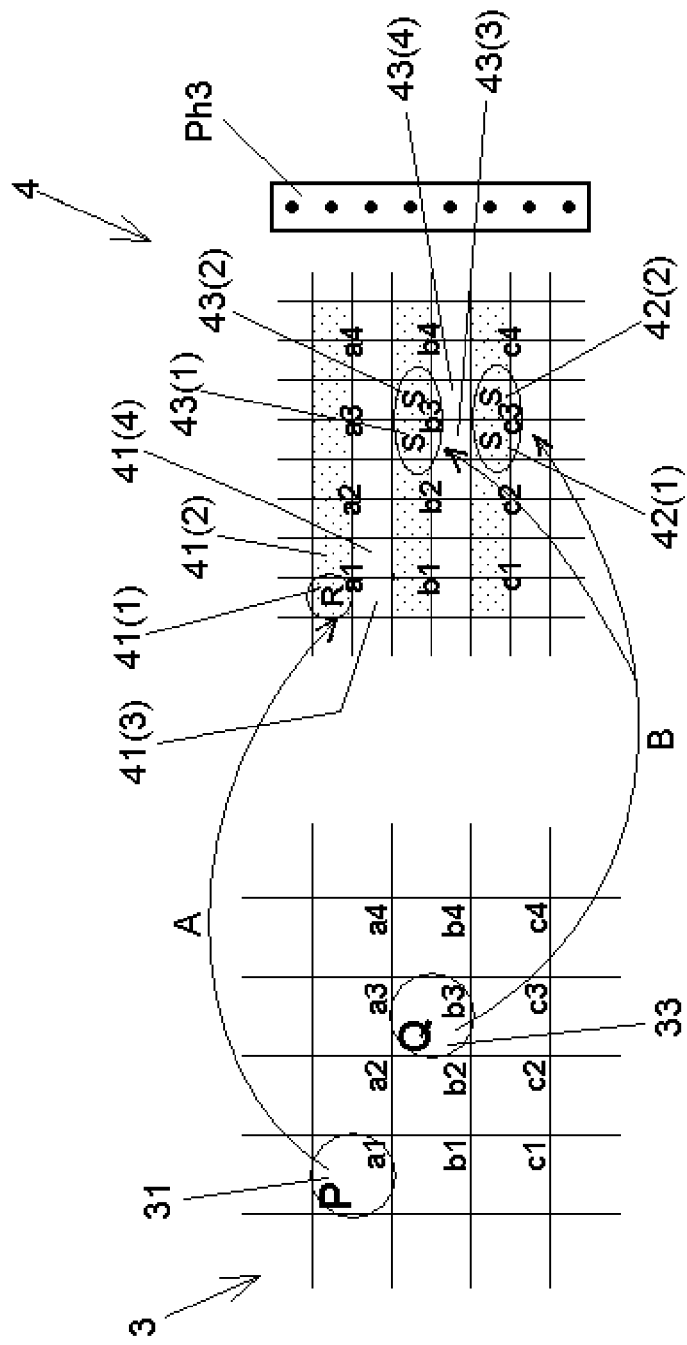
Figure 1C:
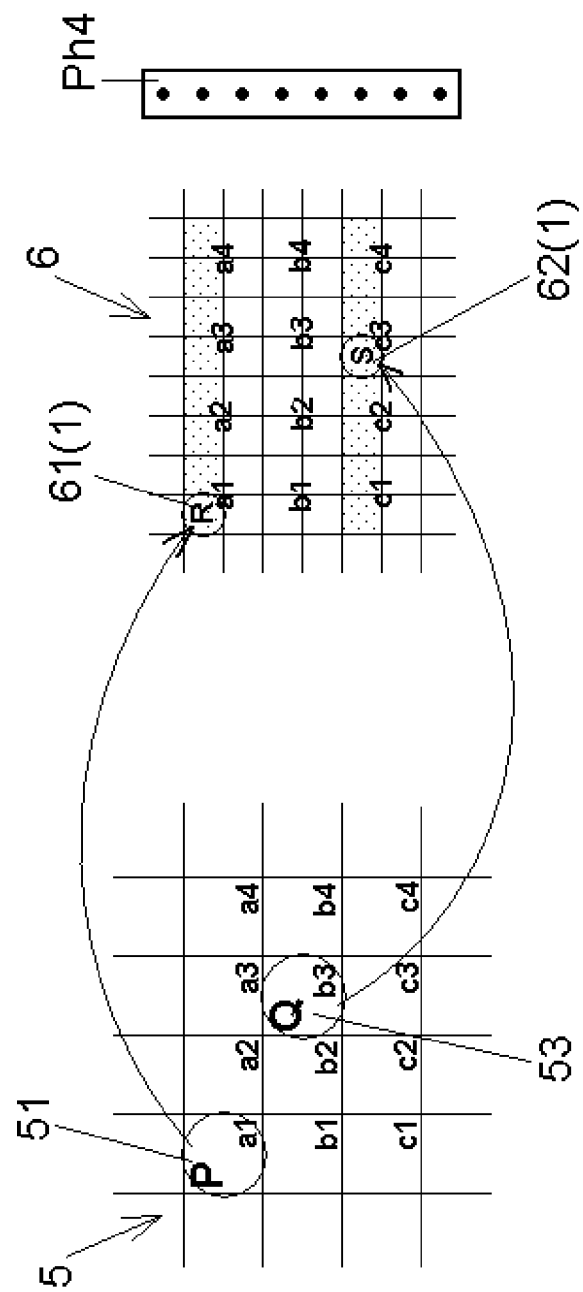

Some non-limiting examples will be described in the following with reference to the appended drawings, in which:

FIGS. 1a and 1b and 1c illustrate schematically methods for printing with a printhead, according to three examples.

Figure 2:
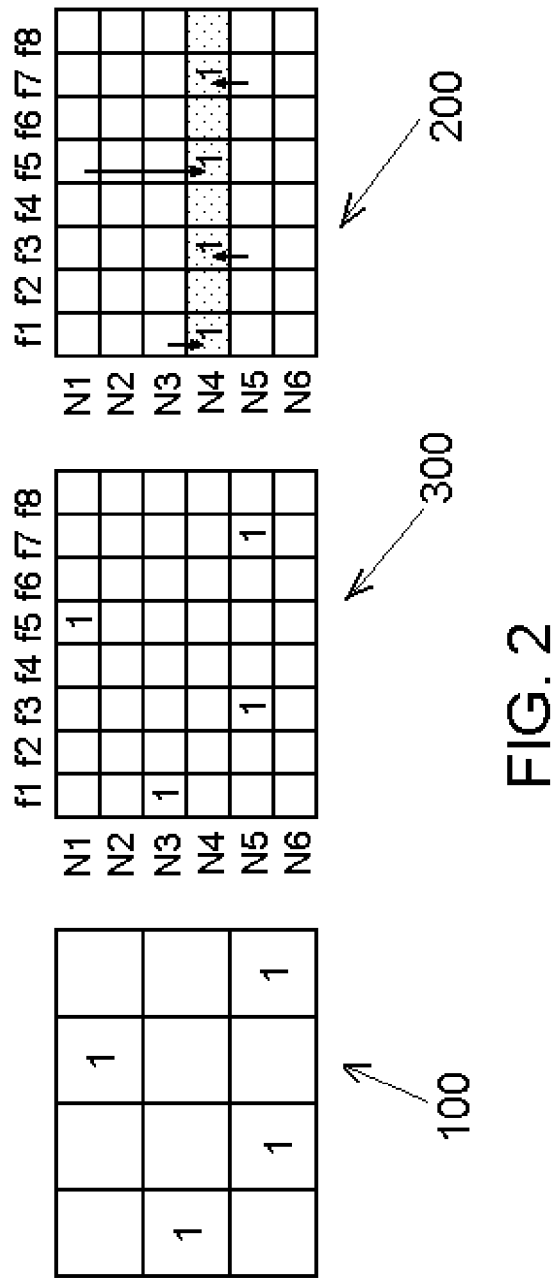
Figure 3:
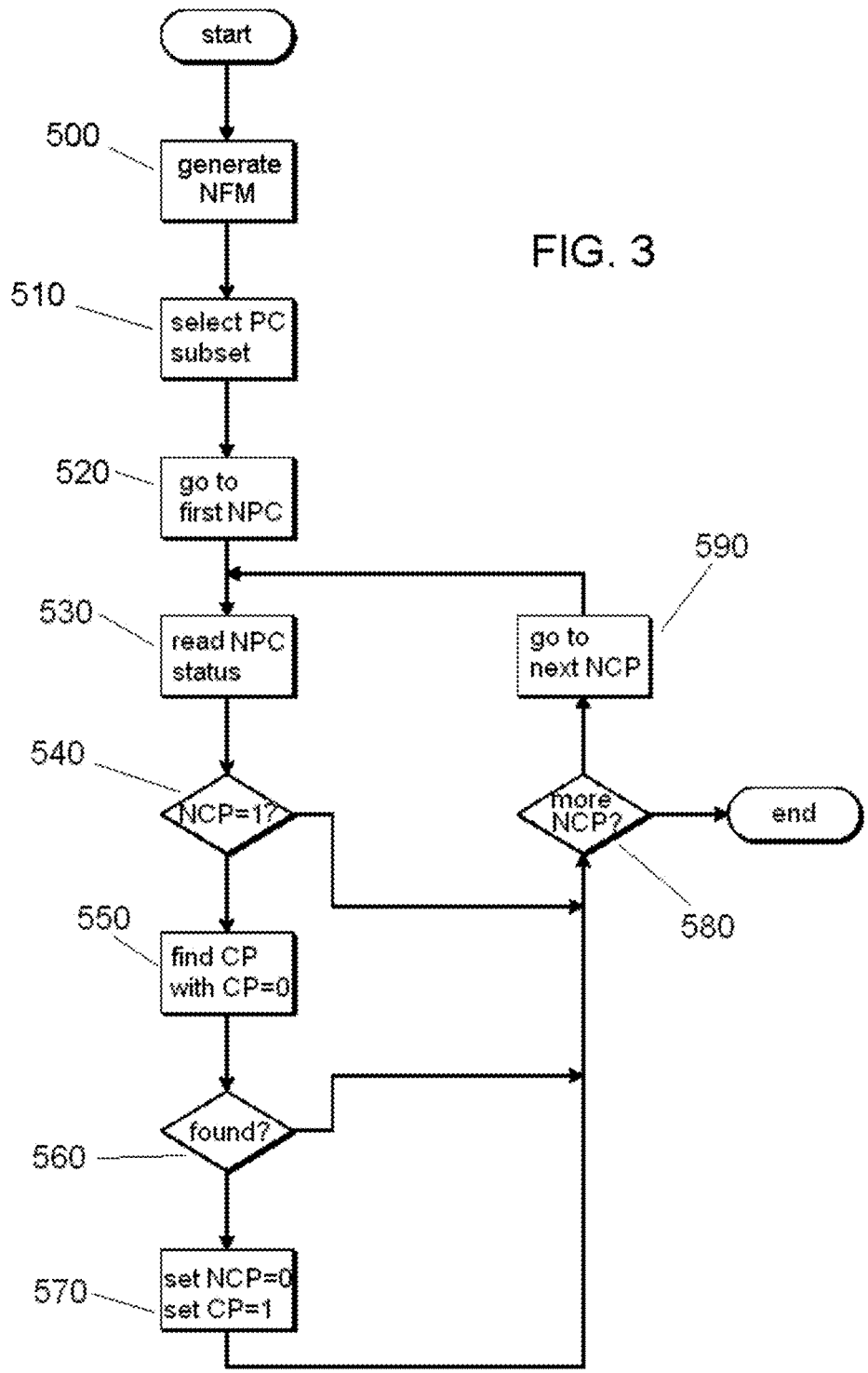
Figure 6:
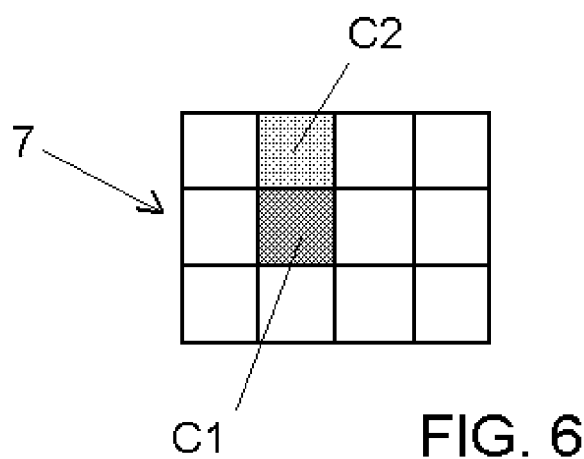

FIG. 2 illustrate schematically a further example of a method;

FIG. 3 is a flow diagram of the processing of cells in an example of a method;

FIGS. 4a, 4b, 5a and 5b illustrate the effect of applying examples of a method described herein to images;

FIG. 6 illustrates further examples of methods described herein; and

Figure 7:
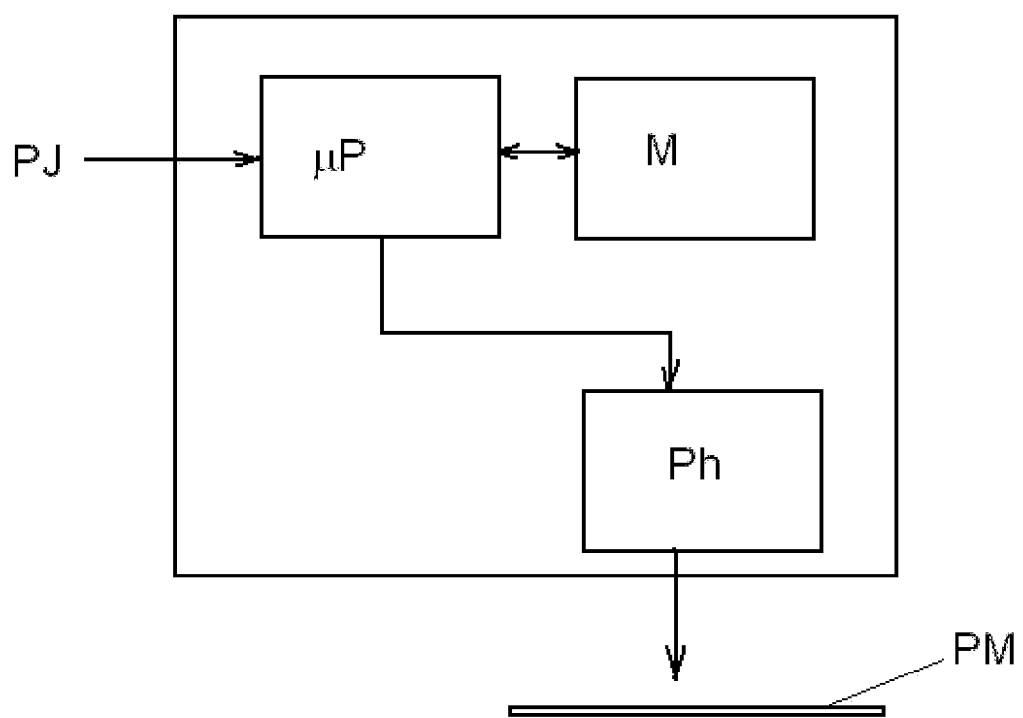

FIG. 7 shows schematically a printing apparatus in which examples of a method as disclosed herein may be applied.

In an inkjet printer each page of a print job may be rasterized, that is, converted from a computer output format such as Postscript™ or Portable Document Format™ to a contone bitmap, for example by means of a raster image processor.

A contone bitmap may be expressed as an imaging matrix, i.e. an array of cells arranged in rows and columns and containing imaging data, in which each cell of the matrix contains information related to the colour of a corresponding area of the image to be printed, for example as a proportion of primary colours R, G, B; consequently, each cell contains information related to the ink to be deposited on a corresponding area of the print medium.

The contone bitmap will thus be referred to herein also as "contone matrix".

The contone bitmap may be processed by an application-specific integrated circuit (ASIC) which converts the bitmap into a halftone image, wherein for each pixel of the halftone image there may be typically specified a number of ink drops of various colours, to give the appearance of a continuous tone image when printed. The most basic colour printer will use combinations of cyan, magenta and yellow (CMY) to make the various colours; for increased quality, true black ink may be also available (CMYK), and also two additional inks, light cyan and light magenta (CcMmYK).

Instead of specifying the number of ink drops, the pixels of the halftone image may also specify different information, which is related to such ink drops; the number of ink drops may then be determined later on in the processing pipeline.

The halftone image may thus be expressed as an imaging array or matrix, in which each cell contains information related to the ink drops to be deposited on a corresponding area of the print medium. The halftone image will thus be referred to herein also as "halftone matrix".

Each ink (C, M, Y, etc.) is generally printed from a separate printhead, and each printhead may have a controller which analyses the halftone image and for example applying suitable print masks specifies the nozzle firing sequence to cause the printhead to lay down drops of ink at the correct points on the print medium, so that the printheads in combination reproduce the halftone image.

The set of instructions that specify the nozzle firing sequence may be expressed as an imaging array or matrix, in which each cell contains information related to the ink drops to be deposited on a corresponding area of the print medium; e.g. each cell may typically contain an indication of whether a particular nozzle, in a particular firing step, has to fire an ink drop or not.

In a scanning printer in which printheads are generally arranged with their nozzles extending in the paper advance direction, the nozzle firing instructions may be expressed as a matrix in which each row of the matrix is associated to a nozzle of the printhead, and each column is associated to a firing step in time (and therefore to a position of the carriage along the scan axis): thus each cell of the matrix corresponds to an area of the print medium on which a nozzle may fire an ink drop during a firing step.

In a page wide array (PWA) printer, since the printheads are generally arranged with their nozzles extending in a direction at right angles to the paper advanced direction, each column of the matrix may be associated to a nozzle, and each row may be associated to a firing step.

The set of instructions that specify the nozzles firing sequence will be referred to herein also as "nozzle firing matrix" or "firing matrix".

Depending on the particular method employed to control the printing operation, it may be that only one column (scanning printer) or only one row (PWA printer) of the firing matrix exist at a given time, just before the firing step corresponding to such a column or row; alternatively, columns or rows of the matrix corresponding to a number of firing steps, or even a complete matrix for the whole halftone image, may be generated in advance.

As explained above, decap may arise because nozzles that have not fired for a certain amount of time need a number of firing events before recovering. The expression "firing event" refers herein to the action of one particular nozzle that fires or tries to fire a drop of ink during a firing step.

If a nozzle fires a drop of ink every M firing steps, and if it takes DR firing events to recover the nozzle from e.g. a viscous plug, then the length of the print medium affected by decap is approximately:

Decap length=$M \times DR$

Thus, the lower is M, i.e. the higher is the firing frequency of a nozzle, the smaller is the decap length for this nozzle, because the nozzle recovers from decap earlier.

In examples of the method disclosed herein, the effect of decap is reduced by causing some prioritized nozzles, corresponding to prioritized cells of an imaging matrix, to fire ink that without applying examples of the method disclosed herein would be associated with non-prioritized matrix cells and non-prioritized nozzles.

Such prioritized nozzles fire ink drops with a higher firing frequency, and this has the consequence that the decap length on the print medium is smaller, so the effect of decap is less visible.

An example of a method for printing with an inkjet printhead is disclosed in the following, with reference to FIG. 1a.

According to this example, a first imaging matrix 1 is generated, that comprises a plurality of cells, of which only cells 11, 12 and 13 have been assigned a reference numeral. Each cell of matrix 1 may contain information related to the ink to be deposited on a corresponding area of the print medium a1, a2, a3, . . . ; in this example cell 11 of the matrix corresponding to area a1 of the print medium contains information P, cell 12 of the matrix corresponding to area c3 of the print medium contains no information, and cell 13 of the matrix corresponding to area b3 of the print medium contains information Q.

The first imaging matrix 1 may be for example a contone matrix, wherein P and Q may represent colours to be printed in terms of the proportions of primary colours R, G, B; or it can be for example a halftone matrix, wherein P and Q may represent for example a number of ink drops of each ink C, M, Y to be fired on the print medium.

On the basis of the first imaging matrix 1, a second imaging matrix 2 is generated, also comprising a plurality of cells, of which only cells 21 and 22 have been assigned a reference numeral. Each cell of matrix 2 may contain information related to the ink drops to be deposited on a corresponding area of the print medium a1, a2, a3, . . . ; in this example cell 21 of the matrix corresponding to area a1 of the print medium contains information R, and cell 22 of the matrix corresponding to area c3 of the print medium contains information S.

The second imaging matrix 2 may be for example a halftone matrix, if the first matrix 1 is a contone matrix; or it may be a nozzle firing matrix for one of the inks, if the first matrix 1 is a halftone matrix.

In this example, the rows of the first matrix and second matrix may be related to the nozzles of a printhead (i.e. each row may contain information about one or more nozzles, for all firing steps), while the columns of the first matrix and second matrix may be related to the firing steps (i.e. each column may contain information about one or more firing steps, for all the nozzles). This may be a typical way of presenting the contone, halftone and nozzle firing matrix in the case of a scanning printer.

In order to assist understanding, two printheads Ph1 and Ph2 each with a plurality of nozzles are schematically shown at one side of FIG. 1a, in correspondence with matrix 2: printhead Ph1 is shown to represent a case in which each row of the second matrix corresponds to one nozzle (matrix 2 could be for example a nozzle firing matrix, and then each column of matrix 2 would correspond to a firing step), while printhead Ph2 is shown to represent a case in which each row of the second matrix corresponds to two nozzles (matrix 2 could be for example a halftone matrix, and then each column of matrix 2 could typically correspond for example to two firing steps).

If the method is performed in a PWA printer, a typical way of presenting the contone, halftone and nozzle firing matrix may be with the rows of each matrix being related to the firing steps, and the columns of each matrix being related to the nozzles, thus with a 90° shift with respect to FIG. 1a.

In both cases, and due to the different arrangement of the printheads between scanning printers and PWA printers, a row of each matrix may correspond to one or more lines printed across the width of the print medium, in a direction at right angles to the medium advance direction.

For the sake of simplicity, in some passages of the following description reference may be made to a cell of a matrix and a "corresponding cell" of the other matrix; this is intended to mean that such cells correspond to the same area of the print medium.

Turning back to FIG. 1a, some cells of the second matrix 2, in this example the cells corresponding to areas a1, a2, a3, a4 of the print medium and the cells corresponding to areas c1, c2, c3, c4 of the print medium, may be selected to form a subset of prioritized cells (shown with a dotted filling in the figure).

According to this example of the method, the information S in prioritized cell 22 of the second matrix 2, corresponding to area c3 of the print medium, depends on the information Q in cell 13 of the first matrix 1, which corresponds to a different area b3 of the print medium than the area c3 of cell 22, as shown by arrow B, instead of being derived only from information in cell 12 of the first matrix 1, which corresponds to the same area a1 of the medium.

Thus, there is a displacement between the first matrix 1 and the second matrix 2, whereby ink that in the first matrix was associated to one area of the print medium, and thus to some specific nozzles, is shifted in the second matrix to be fired in a different area of the print medium, and thus by different nozzles, that belong to a subset of prioritized nozzles. Some nozzles associated to prioritized cells thus fire more ink drops than those corresponding to their print medium area in the first matrix.

Not all the prioritized cells of the second matrix 2 contain information that depends on a cell of the first matrix 1 corresponding to a different area, as disclosed for cell 22 in the previous paragraph: that is, not all prioritized nozzles fire ink drops that in the first matrix are associated to other print medium areas.

For example, information R in cell 21 of the second matrix 2, corresponding to area a1 of the print medium, may be derived from the information P in cell 11 of the first matrix 1, which corresponds to the same area a1, as shown by arrow A.

In examples of the method, the prioritized cells of the second matrix, such as cell 21, for which the corresponding cell 11 in the first matrix contains suitable information, may derive their information from said corresponding cell 11, while the prioritized cells of the second matrix, such as cell 22, for which the corresponding cell 12 in the first matrix e.g. contains no information, may be employed to receive information that depends on other cells of the first matrix, such as cell 13 for which the corresponding cell in the second matrix is a non-prioritized cell.

FIG. 1b illustrates an example of a method similar to that of FIG. 1a, with a first matrix 3 and a second matrix 4 similar to first matrix 1 and second matrix 2 of FIG. 1a; however, in this example the second matrix 4 has a higher resolution than the first matrix 1, such that for each cell of the first matrix 3, for example cell 31, that corresponds to an area a1 of the print medium, there are four corresponding cells 41(1), 41(2), 41(3), 41(4), in the second matrix 4.

A schematic printhead Ph3 has been shown in the figure to represent a case in which each row of the second matrix corresponds to one nozzle of the printhead (and each column may correspond to a firing step), although in other cases each row may also correspond to more than one nozzle, and/or each column to more than one firing step.

In this example of the method, in the second matrix 4, for example one row out of two may be selected to form a subset of prioritized cells (shown with a dotted filling in the figure). As can be seen, this means that for each cell of the first matrix 3, for example cell 31, there may be two prioritized cells of the second matrix 4, for example cells 41(1 and 41(2), while other two cells 41(3) and 41(4) are not prioritized.

For describing this example of the method, it is assumed that the information P contained in cell 31 of the first matrix 3 involves e.g. firing one drop of ink, or more generally an amount of ink for which only one or two cells of the second matrix are needed, while the information Q contained in cell 33 of the first matrix 3 involves e.g. firing four drops of ink, or more generally an amount of ink for which more than two cells of the second matrix are needed.

In the second matrix, the information S in prioritized cells 42(1) and 42(2) of the second matrix 3, corresponding to area c3 of the print medium, depends on the information Q in cell 33 of the first matrix 3, which corresponds to a different area b3 of the print medium than the area c3 of cell 22, as shown by a branch of arrow B.

This displacement according to an example of the method is done because the information Q contained in cell 33 of the first matrix 3 involves firing more ink on the print medium than the amount that can be fired by the nozzle corresponding to cells 43(1) and 43(2). In this case, instead of firing part of the ink with the nozzle associated to cells 43(3) and 43(4), which is a non-prioritized nozzle, this ink is displaced to be fired by the prioritized nozzle corresponding to cells 42(1) and 42(2), which correspond to a different area of the print medium than the area of cell 33.

Thus, like in the example of FIG. 1a, some nozzles associated to prioritized cells fire more ink drops than those corresponding to their print medium area in the first matrix.

Not all the prioritized cells of the second matrix 4 contain information that depends on a cell of the first matrix 3 corresponding to a different area. For example, information R in cell 41(1) corresponding to area a1 of the print medium depends on the information P in cell 31 of the first matrix, which corresponds to the same area a1, as shown by arrow A; and also information S in cells 43(1) and 43(2) corresponding to area b3 of the print medium depends on the information Q in cell 33 of the first matrix, which corresponds to the same area b3, as shown by a branch of arrow B.

FIG. 1c illustrates a further example of a method in a situation similar to that of FIG. 1b, with a first matrix 5 and a second matrix 6 with a higher resolution than the first, but wherein in the second matrix one row out of four is prioritized, instead of one out of two.

As shown, in this case the information R in prioritized cell 61 (1) is derived from the information P of the corresponding cell 51 (no displacement of ink to a different area of the print medium), while the information S in prioritized cell 62(1) depends on the information Q of cell 53, which does not correspond to cell 62(1): in this case there is thus a displacement of ink to a different area of the print medium, because the cells of the second matrix 6 that correspond to cell 53 are non-prioritized cells.

In examples wherein the rows are related to nozzles, such as those of FIGS. 1a, 1b and 1c, for some prioritized cells of the second matrix the information related to the ink drops of a prioritized cell (e.g. cell 22 in FIG. 1a) may depend on a cell (e.g. cell 13 in FIG. 1a) of the first matrix that is located in a different row of the first matrix from the cell (e.g. cell 12 in FIG. 1a) corresponding to the prioritized cell of the second matrix.

Similarly, in examples wherein the columns are related to nozzles, for example in a PWA printer, for some prioritized cells of the second matrix the information related to the ink drops of a prioritized cell may depend on a cell of the first matrix that is located in a different column of the first matrix from the cell corresponding to the prioritized cell of the second matrix.

In both cases, in examples of the method the information related to the ink drops of some of the prioritized cells may depend on cells of the first matrix that are located within three rows and columns on each side of the cell of the first matrix corresponding to the prioritized cell of the second matrix. For example, in FIG. 1a the information of cell 22 depends on cell 13 which is adjacent to cell 12, the latter being the cell corresponding to cell 22. In other examples of the method, the information of cell 22 may depend on other cells, such as for example the cell of the first matrix corresponding to area b2 of the print medium.

As shown in FIGS. 1a, 1b and 1c, in examples of the method the prioritized cells of the second matrix may be selected as rows, or portions of rows; similarly, in examples of the method applied with a layout more typical of a PWA printer, wherein the columns are associated to nozzles, the prioritized cells of the second matrix may be selected as columns, or portions of columns.

In some examples, the prioritized cells may comprise one row/column each two (as shown in FIGS. 1a and 1b), but also one row/column of each three, or one each four (as shown in FIG. 1c), or other proportions. They may also be selected according to a more complex pattern, or even an irregular pattern, depending on the particular features of the image to be printed and the desired effect.

Furthermore, the selection of rows or columns of prioritized cells may vary from one part of the print job to another, for example depending on the features of each part of the image to be printed.

A higher reduction of the effects of decap is achieved if e.g. one row out of four is prioritized, than if e.g. a row out of two, and good results may be achieved if prioritized nozzles work close to their maximum capacity, i.e. their maximum firing frequency. A balance may be found in each case, i.e. for each particular print job and each particular image, depending on the colour, ink density, etc. of the image, in order to reduce decap and at the same time preserve the quality of the printed image.

In case the second matrix is a nozzle firing matrix, examples of the method may be performed once for every ink that is involved in the printing job, in order to generate, on the basis of a common halftone, a nozzle firing matrix for each ink. In this case, the prioritized cells in each of the matrixes may correspond to the same areas of the printing medium, or to different areas of the printing medium.

In examples of the method described herein, the overall amount of ink to be deposited on the print medium may be substantially the same in the first matrix and in the second matrix; the difference lies in that some ink is deposited in positions of the print medium which are displaced from those associated with some cells of the first matrix.

In some examples of the method, cells of the second matrix may be prioritized according to at least two levels of priority: for example, one row out of four may have a higher priority, and another row out of the four may have a lower priority.

For example, an ink drop from a cell of the first matrix corresponding to a non-prioritized cell may be assigned in the first place to a prioritized cell having higher priority if one is available within a distance of three rows/columns, and only if no such higher priority cell is available, it may then be assigned to a lower priority cell.

In such cases, nozzles of the printhead associated with cells having higher priority may fire more ink than cells having lower priority.

Some examples of the method may comprise repeating the step of generating a second matrix, taking the previously generated second matrix as the first matrix when repeating said step: in this case, if in each step a row out of each two rows is prioritized.

According to some examples, a method may be performed with two successive steps:
a first step of generating, on the basis of the first matrix, an intermediate matrix in which the information of each of the cells is derived only from their corresponding cells of the first matrix; and
a second step of modifying the contents of some cells of said intermediate matrix to obtain the second matrix, by prioritizing some cells and displacing ink information from non-prioritized cells to prioritized cells.

In the first step, a matrix is generated with no prioritized cells and with no displacement of ink between areas of the print medium; this matrix is then treated in the second step to prioritize cells and displace ink from non-prioritized to prioritized cells, that is, to concentrate ink firings in nozzles associated to prioritized cells and thus increase the firing frequency and reduce the decap length of these nozzles.

Also in such cases the first matrix may be a contone matrix and the second may be a halftone matrix, or the first may be a halftone matrix and the second may be a nozzle firing matrix.

FIG. 2 shows such an example of a method, in a case where the first matrix is a halftone and the second is a nozzle firing matrix, while FIG. 3 is a flow diagram illustrating an example of the processing of the cells of an intermediate matrix for obtaining the second matrix.

In FIG. 2, halftone matrix 100 is a first matrix from which a nozzle firing matrix or second matrix 200 is generated. As shown, the halftone matrix has a resolution, for example 600×600 dpi, while the nozzle firing matrix 200 has a higher resolution, for example 1200×1200 dpi, whereby for each cell of the halftone matrix 100 there are four corresponding cells in the nozzle firing matrix 200.

Each row of the nozzle firing matrix 200 is related to a nozzle N1, N2, N3, . . . of a printhead, and each column is related to a firing step f1, f2, f3, . . . ; each cell of the matrix is thus a firing event of one of the nozzles in one of the firing steps: i.e. "1" if the nozzle fires an ink drop, or "0" if the nozzle does not fire an ink drop.

For the sake of simplicity, in the halftone matrix 100 only the information related to one ink colour has been indicated; the number in each cell represents the number of ink drops of said ink that have to be deposited in the corresponding area of the print medium. The halftone corresponds to a relatively low density area (only one ink drop per cell, and only in some cells).

With the information in halftone matrix 100, an intermediate nozzle firing matrix 300 may be generated, with the same rows and columns of the nozzle firing matrix 200; in matrix 300 no cells are prioritized, and thus an ink drop that according to the halftone matrix 100 has to be fired on an area of the print medium is assigned to a cell of the nozzle firing matrix corresponding to the same area of the print medium. For example, the ink dot in the first row, third column of matrix 100 is assigned to a corresponding cell N1,f5 of matrix 300.

In matrix 300 only the cells with value "1" (firing) have been filled; cells having value "0" (no firing) have been left void.

Matrix 300 may then be treated to prioritize some of the rows, and therefore some of the nozzles, to increase the firing frequency of these nozzles, for example by a process such as shown in FIG. 3 and described in the following.

In the example process of FIG. 3:
in step 500, a nozzle firing matrix NFM is generated;
in step 510, a subset of prioritized cells PC of the matrix is selected: for example, a row out of four, corresponding to nozzles N4, N8 (not shown), etc. in FIG. 2;
in steps 520, 530 the status ("0" or "1") of the first non-prioritized cell NPC of the matrix is read (in this case, cell N3,f1);
if it is found in step 540 that the status of the NPC is "1", in step 550 cells of the matrix near this cell are searched to find a prioritized cell CP whose status is "0";
if in step 560 such a prioritized cell CP with status "0" is found available (in the example, cell N4,f1), the nozzle firing matrix NFM is modified in step 570, by changing the status of the non-prioritized cell (in the example cell N3,f1) to "0" and setting to "1" the status of the prioritized cell that was found available (in the example cell N4,f1).

Thus, in step 570, ink that was intended to be fired on an area of the print medium by non-prioritized nozzle N3, is displaced to to be fired on a different area of the print medium, by prioritized nozzle N4.

If in step 540 it is found that the status of a NPC is "0", the process proceeds to step 580; if in this step it is found that there are further NPC in the matrix, it proceeds to step 590 wherein the next NPC is pointed to, and then proceeds again to step 530 to process the next NPC.

If no prioritized cell CP with status "0" is found available in step 560, then no change is made to the matrix, i.e. the NPC that is being considered retains its status "1", and the process proceeds to step 580.

If in step 580 it is decided that there are no further NPC in the matrix, then the process is stopped.

The nozzle firing matrix 200 in FIG. 2 shows the outcome of such a process: in this case, the drops of ink of cells N3,f1, N5,f3, N1,f5, and N5,f7 of matrix 300 have been displaced to prioritized cells N4,f1, N4,f3, N4,f5, and N4,f7, respectively, of matrix 200; the information in these cells of matrix 200 is thus derived from cells of the halftone matrix 100 that correspond to a different area of the print medium.

In other examples, and depending on the drops to be fired, their position in the matrix, and the number of prioritized nozzles, some drops of ink may be displaced not only from one nozzle to another, but also from one firing step to another, i.e. in an oblique direction in the matrix.

Examples of a process similar to that described with reference to FIGS. 2 and 3 may be performed with a contone matrix as first matrix and a halftone matrix as second matrix (having the same or different resolution); in such a process, an intermediate halftone matrix would be generated, and the information in some of the cells of this matrix displaced to other cells to generate a final halftone matrix.

In further examples of the method, an intermediate matrix is not employed: the second matrix may then be generated directly from the first matrix, taking into account, when processing the information in a cell of the first matrix to transfer it to the second matrix, the prioritized cells that are available in the second matrix being generated.

FIGS. 4a, 4b and 5a, 5b illustrate the effect of applying an example of a method described herein to two parts of an image. In these figures, the different shades of grey correspond to different colours.

Figure 4A:
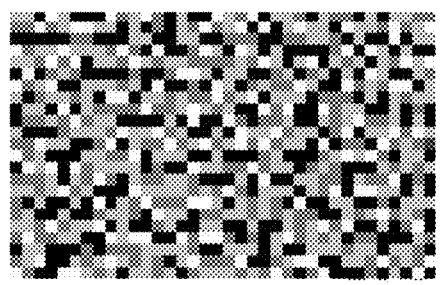
Figure 4B:

FIG. 4a shows an original halftone of an area fill, and FIG. 4b shows a halftone generated applying an example of the method to the same area fill. In this case an example of the method was applied wherein the step of generating the halftone matrix is repeated, taking the previously generated halftone matrix as the first matrix, and wherein in each step, a row out of each two rows has been prioritized.

Figure 5A:
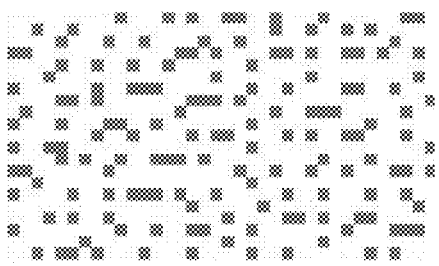
Figure 5B:
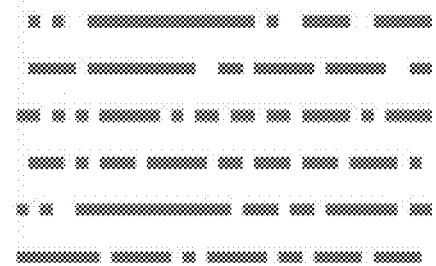

FIGS. 5a and 5b are similar to FIGS. 4a and 4b, for a different image; FIG. 5b shows the result of applying to the image the same example of the method applied in the case of FIG. 4b.

It can be seen from the figures that prioritized nozzles will fire ink that originally was associated with areas of the print medium corresponding to non-prioritized nozzles; this increases the firing frequency of prioritized nozzles, and as a consequence the effect of decap will be reduced.

For example, it is visible in FIG. 4b for the darker colour ink that one nozzle out of four (those corresponding to the almost continuous lines) fires ink virtually in every firing step, another nozzle out of four fires only in some firing steps, while the remaining two nozzles out of four never fire. This shows that as a result of the example of the method applied in this case, the prioritized nozzles may comprise nozzles with higher priority and nozzles with lower priority.

On the contrary, in the original halftone of FIG. 4a it can be seen that for the darker colour all the nozzles fire some ink drops, with similar frequencies.

In further examples of a method for printing with a printhead, the information related to the ink drops of some prioritized cell depends on at least two cells of the first matrix: a first cell which corresponds to the same area of the print medium of said prioritized cell, and a second cell that corresponds to a different area of the print medium.

For example, if the second cell of the first matrix indicates that some ink is to be deposited in the corresponding area of the print medium, then the information related to ink drops of the prioritized cell is determined by increasing the amount of ink to be deposited according to the information of the first cell of the first matrix. For example, twice this amount of ink to be deposited according to the information of the first cell may be fired by the nozzles associated with the prioritized cell.

According to another example, the information related to ink drops of the prioritized cell may be determined by a sum of the information of the first cell of the first matrix and the information of the second cell of the first matrix.

FIG. 6 illustrates an example of such a method applied to generate a halftone matrix 8 starting from a contone matrix 7 having the same resolution.

In the example, one cell of the contone matrix 7 contains information that a colour C1 has to be printed on the corresponding area of the print medium, and another cell of the contone matrix 7 contains information that a colour C2 has to be printed on the corresponding area of the print medium.

In one example, colour C1 may involve e.g. 2 drops of cyan ink, while colour C2 may involve e.g. 1 drop of cyan ink and 1 drop of yellow ink.

When generating the halftone, one row of the halftone out of each two may be prioritized; in this case, the middle row in the figure.

In examples of the method, cell X2 of the halftone, which is not a prioritized cell and corresponds to the cell of the contone having colour C2, may be left void (no ink is printed from the nozzles corresponding to this cell); while cell X1 of the halftone, which is a prioritized cell and corresponds to the cell of the contone having colour C1, may receive information that depends both on cell having colour C1, and on cell having colour C2.

In one example, the information in cell X1 may be twice the amount of ink drops corresponding to C1; in this case, 4 drops of cyan. This information depends also on cell C2, because if no ink was foreseen in cell C2, the information in cell X1 would be only two drops of cyan.

In other examples, the information in cell X1 may be a sum of the drops of ink associated to C1 and those associated to C2; in this case, 3 drops of cyan and 1 drop of yellow.

In the above and other examples of the method, the first matrix may be a single matrix for a print job, for example a contone or a halftone; the second matrix may also be a single matrix, for example if it is a halftone matrix, but if for example the second matrix is a nozzle firing matrix there may be such a second matrix for each ink. A second matrix for each colour ink employed in the printing job may thus be generated by applying examples of the method.

In case of multi-pass printing, wherein typically a different nozzle firing matrix is generated for each pass, examples of the method may be employed to generate a single halftone matrix with prioritized cells from the contone matrix, or to generate multiple firing matrixes with prioritized cells, one for each pass, from the halftone matrix; it is also possible to employ examples of the method in both such steps.

FIG. 7 shows schematically an inkjet printing apparatus in which a method as disclosed herein may be applied. The apparatus may comprise a printhead Ph for printing on a print medium PM, a non-transitory storage medium M, and a processor μP adapted to receive a print job PJ. Program instructions may be embodied in the non-transitory storage medium M and may be executable by the processor μP, such that when the instructions are executed in the processor, the processor implements an example of a method as disclosed herein.

The apparatus may be a printer selected between a page wide array printer or a scanning printer.

A computer program product may comprise program instructions adapted, when executed on a computer, for causing the computer to implement an example of a method disclosed herein.

A computer readable medium may have computer-executable instructions stored thereon that, if executed by a computer, cause the computer to implement an example of a method disclosed herein.

Although only a number of particular embodiments and examples have been disclosed herein, further variants and modifications of the disclosed print media products are possible; other combinations of the features of embodiments or examples described are also possible. Reference signs related to drawings and placed in parentheses in a claim, are solely for attempting to increase the intelligibility of the claim, and shall not be construed as limiting the scope of the claim. Thus, the scope of the present invention should not be limited by particular examples or embodiments, but should be determined only by a fair reading of the claims that follow.

The invention claimed is:

1. A method for printing with a printhead, the printhead comprising nozzles to fire ink drops on a print medium, the method comprising:
  generating a first imaging matrix comprising a plurality of cells each containing information related to the ink drops to be deposited on a corresponding area of the print medium;
  on the basis of the first imaging matrix, generating a second imaging matrix, comprising a plurality of cells each containing information related to the ink drops to be deposited on a corresponding area of the print medium; and
  prioritizing a subset of the cells of the second imaging matrix, and for each respective prioritized cell of some of the cells in the subset, the information related to the ink drops of the respective prioritized cell depends on a cell of the first imaging matrix that corresponds to a different area of the print medium than the area of the respective prioritized cell of the second imaging matrix,
  wherein upon printing using the information of the second imaging matrix, nozzles of the printhead associated with the some of the cells in the subset fire ink that in the first imaging matrix is associated with areas of the print medium corresponding to non-prioritized cells.

2. A method as claimed in claim 1, wherein the second imaging matrix includes rows related to nozzles, and columns related to firing steps, and wherein for each respective prioritized cell of the some of the cells in the subset, the information related to the ink drops of the respective prioritized cell depends on a cell of the first imaging matrix that is located in a different row with respect to a cell of the first imaging matrix corresponding to the same area as the print medium as the respective prioritized cell of the second imaging matrix.

3. A method as claimed in claim 1, wherein the second imaging matrix includes rows related to firing steps, and columns related to nozzles, and wherein for each respective prioritized cell of the some of the cells in the subset, the information related to the ink drops of the respective prioritized cell depends on a cell of the first imaging matrix that is located in a different column with respect to a cell of the first imaging matrix corresponding to the same area of the print medium as the respective prioritized cell of the second imaging matrix.

4. A method as claimed in claim 2, wherein for each respective prioritized cell of the some of the cells in the subset, the information related to the ink drops of the respective prioritized cell depends on a cell of the first imaging matrix that is located within three rows and columns on each side of the cell of the first imaging matrix corresponding to the same area of the print medium as the respective prioritized cell of the second imaging matrix.

5. A method as claimed in claim 1, wherein the cells of the subset comprise a number of cells adjacent to each other in a row of the second imaging matrix, or a number of cells adjacent to each other in a column of the second imaging matrix.

6. A method as claimed in claim 5, wherein the cells in the subset comprise rows of cells or columns of cells of the second imaging matrix.

7. A method as claimed in claim 6, wherein the cells in the subset comprise one row or column of cells out of two rows or columns, one row or column of cells out of three rows or columns, or one row or column of cells out of four rows or columns.

8. A method as claimed in claim 1, wherein the second imaging matrix has the same or higher resolution than the first imaging matrix.

9. A method as claimed in claim 8, wherein the second imaging matrix has higher resolution than the first imaging matrix.

10. A method as claimed in claim 1, wherein the first imaging matrix is a contone matrix and the second imaging matrix is a halftone matrix.

11. A method as claimed in claim 1, wherein the first imaging matrix is a halftone matrix and the second imaging matrix is a nozzle firing matrix.

12. A method as claimed in claim 1, wherein an overall amount of ink to be deposited on the print medium is substantially the same in the first imaging matrix and in the second imaging matrix.

13. A method as claimed in claim 1, wherein some cells of the second imaging matrix are prioritized according to at least two levels of priority, such that upon printing using the information of the second imaging matrix, nozzles of the printhead associated with cells having higher priority fire more ink than cells having lower priority.

14. A method as claimed in claim 1, further comprising re-iterating the generating of the second imaging matrix, wherein a previously generated second imaging matrix is taken as the first imaging matrix when re-iterating the generating of the second imaging matrix.

15. A method as claimed in claim 1, comprising
  generating, on the basis of the first imaging matrix, an intermediate matrix in which information of each of the cells in the intermediate matrix is derived only from cells of the first imaging matrix corresponding to the same area of the print medium; and modifying contents of some cells of the intermediate matrix to obtain the second imaging matrix, by prioritizing some cells of the intermediate matrix and displacing information from non-prioritized cells to prioritized cells.

16. A method as claimed in claim 1, wherein for a first prioritized cell of the cells in the subset, the information related to the ink drops of the first prioritized cell depends on a first cell of the first imaging matrix that corresponds to the same area of the print medium as the first prioritized cell, and also on a second cell of the first imaging matrix that corresponds to a different area of the print medium than the area as the first prioritized cell.

17. A method as claimed in claim 16, wherein if the information of the second cell of the first imaging matrix indicates that some ink is to be deposited in the corresponding area of the print medium, then the information related to ink drops of the first prioritized cell is determined by increasing an amount of ink to be deposited according to the information of the first cell of the first imaging matrix.

18. A method as claimed in claim 16, wherein if the information of the second cell of the first imaging matrix indicates that some ink is to be deposited in the corresponding area of the print medium, then the information related to ink drops of the first prioritized cell is determined by computing a sum of an amount of ink to be deposited according to the information of the first cell of the first imaging matrix and the amount of ink to be deposited according to the information of the second cell of the first imaging matrix.

19. An inkjet printing apparatus comprising:
a processor; and
a non-transitory storage medium having program instructions that are executable on the processor to:
  generate a first imaging matrix comprising a plurality of cells each containing information related to ink drops to be deposited on a corresponding area of a print medium;
  generate, based on the first imaging matrix, a second imaging matrix, comprising a plurality of cells each containing information related to ink drops to be deposited on a corresponding area of the print medium;
  prioritize a subset of the cells of the second imaging matrix; and
  for each respective prioritized cell of some of the cells in the subset, derive the information related to the ink drops of the respective prioritized cell based on a cell of the first imaging matrix that corresponds to a different area of the print medium than the area of the respective prioritized cell of the second imaging matrix.

20. A non-transitory computer readable medium having computer-executable instructions stored thereon that, when executed by a computer, cause the computer to:
  generate a first imaging matrix comprising a plurality of cells each containing information related to ink drops to be deposited on a corresponding area of a print medium;
  generate, based on the first imaging matrix, a second imaging matrix, comprising a plurality of cells each containing information related to ink drops to be deposited on a corresponding area of the print medium;
  prioritize a subset of the cells of the second imaging matrix, wherein the cells in the subset are prioritized over non-prioritized cells of the second imaging matrix; and
  for each respective prioritized cell of some of the cells in the subset, derive the information related to the ink drops of the respective prioritized cell based on a cell of the first imaging matrix that corresponds to a different area of the print medium than the area of the respective prioritized cell of the second matrix, such that upon printing using the information of the second imaging matrix, nozzles of a printhead associated with the some of the cells in the subset fire ink that in the first imaging matrix is associated with areas of the print medium corresponding to the non-prioritized cells.

21. The inkjet printing apparatus of claim 19, wherein the first imaging matrix includes rows and columns of cells, wherein the second imaging matrix includes rows and columns of cells, and wherein for each respective prioritized cell of the some of the cells in the subset, the derived information related to the ink drops of the respective prioritized cell is based on a cell of the first imaging matrix that is located in a different row or different column with respect to a cell of the first imaging matrix corresponding to the same area of the print medium as the respective prioritized cell of the second imaging matrix.

22. The non-transitory computer readable medium of claim 20, wherein the first imaging matrix includes rows and columns of cells, wherein the second imaging matrix includes rows and columns of cells, and wherein for each respective prioritized cell of the some of the cells in the subset, the derived information related to the ink drops of the respective prioritized cell is based on a cell of the first imaging matrix that is located in a different row or different column with respect to a cell of the first imaging matrix corresponding to the same area of the print medium as the respective prioritized cell of the second imaging matrix.

* * * * *